(12) United States Patent
Klapper et al.

(10) Patent No.: US 12,513,170 B2
(45) Date of Patent: Dec. 30, 2025

(54) ADVANCED INTRUSION PREVENTION MANAGER

(71) Applicant: Continental Teves AG & Co. OHG, Frankfurt am Main (DE)

(72) Inventors: Patrick Thomas Michael Klapper, Weiterstadt (DE); Christopher Roth, Wiesbaden (DE)

(73) Assignee: Continental Automotive Technologies GmbH, Hannover (DE)

( * ) Notice: Subject to any disclaimer, the term of this patent is extended or adjusted under 35 U.S.C. 154(b) by 442 days.

(21) Appl. No.: 17/769,487

(22) PCT Filed: Sep. 21, 2020

(86) PCT No.: PCT/EP2020/076258
§ 371 (c)(1),
(2) Date: Apr. 15, 2022

(87) PCT Pub. No.: WO2021/073835
PCT Pub. Date: Apr. 22, 2021

(65) Prior Publication Data
US 2024/0137373 A1 Apr. 25, 2024
US 2024/0236122 A9 Jul. 11, 2024

(30) Foreign Application Priority Data

Oct. 17, 2019 (EP) .................................... 19203920
Jan. 31, 2020 (EP) .................................... 20154922

(51) Int. Cl.
*H04L 9/40* (2022.01)
*H04L 67/12* (2022.01)

(52) U.S. Cl.
CPC .......... *H04L 63/1425* (2013.01); *H04L 63/20* (2013.01); *H04L 67/12* (2013.01)

(58) Field of Classification Search
CPC ..... H04L 63/1425; H04L 63/20; H04L 67/12; H04L 63/1441; H04W 4/48; H04W 4/44; G06F 21/554; G06F 21/568
See application file for complete search history.

(56) References Cited

U.S. PATENT DOCUMENTS

| | | | |
|---|---|---|---|
| 9,661,006 B2 | 5/2017 | Kantor et al. | |
| 9,866,542 B2 | 1/2018 | Baltes et al. | |
| 10,168,703 B1* | 1/2019 | Konrardy | ........... G01C 21/3453 |
| 2013/0104186 A1 | 4/2013 | Dietz et al. | |
| 2014/0107875 A1 | 4/2014 | Beyer et al. | |
| 2017/0155679 A1 | 6/2017 | Choi | |
| 2018/0026945 A1 | 1/2018 | Shulkin et al. | |

(Continued)

FOREIGN PATENT DOCUMENTS

| | | |
|---|---|---|
| DE | 102011076350 A1 | 11/2012 |
| EP | 2892199 A1 | 7/2015 |

(Continued)

OTHER PUBLICATIONS

Marina Gutierrez "Harmonization of TSN parameter modelling with automotive design flows" TTTech Auto AG, Sep. 10, 2019.

(Continued)

*Primary Examiner* — Farid Homayounmehr
*Assistant Examiner* — Suman Debnath

(57) ABSTRACT

The present invention is related to the prevention of intrusions on an in-vehicle network.

13 Claims, 5 Drawing Sheets

(56) References Cited

U.S. PATENT DOCUMENTS

| | | | |
|---|---|---|---|
| 2018/0205703 A1* | 7/2018 | Grau | H04L 63/0209 |
| 2018/0262466 A1* | 9/2018 | Atad | H04L 63/0245 |
| 2019/0081966 A1 | 3/2019 | Ploucha et al. | |
| 2019/0182267 A1* | 6/2019 | Aher | H04W 4/48 |

FOREIGN PATENT DOCUMENTS

| | | |
|---|---|---|
| EP | 3373553 A1 | 9/2018 |
| GB | 2530864 A | 4/2016 |
| JP | 2013141947 A | 7/2013 |
| JP | 2016092645 A | 5/2016 |
| WO | 0051360 A1 | 8/2000 |
| WO | 0126331 A2 | 4/2001 |
| WO | 2011101414 A1 | 8/2011 |
| WO | 2017024078 A1 | 2/2017 |
| WO | 2017046805 A1 | 3/2017 |
| WO | 2019030763 A1 | 2/2019 |

OTHER PUBLICATIONS

Charlie Miller et al. "A Survey of Remote Automotive Attack Surfaces (p. 92)" Jul. 27, 2014.

Hyeokchan Kwon et al. "Mitigation mechanism against in-vehicle network intrusion by reconfiguring ECU and disabling attack packet", 2018.

N.N. "Avnu'sUse of 802.1 TSN Mechanisms for Industrial and Automotive Markets", IEEE 802.1 Plenary, Jul. 2016.

Search Report dated Aug. 28, 2020 from corresponding European patent application No. 20154922.7.

International Search Report and Written Opinion dated Oct. 27, 2020 from corresponding International patent application No. PCT/EP2020/076258.

Decision to refuse a European patent application (Art. 97(2) EPC) dated Jun. 26, 2025 from corresponding European patent application No. 20154922.7.

* cited by examiner

100

ADVANCED INTRUSION PREVENTION MANAGER

BACKGROUND

The present invention is related to the prevention of intrusions on an in-vehicle network. More particularly, the present invention relates to systems and methods for the prevention of intrusions on an in-vehicle network, such as Automotive Ethernet in-vehicle networks.

The detection of attacks on in-vehicle networks is known from the state of the art. To detect attacks so-called Intrusion Detection Systems, also referred to as IDS, are used. Generally, such IDS are installed on central network components, such as gateways and/or domain controllers.

After an intrusion is detected on the in-vehicle network it is known from the state-of-the-art to report the intrusion to a so-called Security Operation Center, also referred to as SOC. The SOC performs a security analysis of the intrusion. After an analysis in the SOC is performed, actions, such as an over-the-air software update, for example, for fixing a vulnerability, are executed. Furthermore, identified intrusions can also be logged by the IDS, for example, in a secure logging area, for example, protected by a Hardware Security Module, also referred to as HSM.

Furthermore, in the traditional office IT domain, intrusion detection and prevention systems, also referred to as IDPS, are already state-of-the-art which can also automatically and actively react, for example, by blocking communication and/or closing connections.

In the automotive domain, network elements, such as switches and/or Electronic Control Units, also referred to as ECUs, are capable to filter (e.g., block) traffic, redirect traffic and/or to do bandwidth limitations/throttling. These actions can be activated via pre-defined static rules.

Furthermore, in CAN-based (CAN: Controller Area Network) in-vehicle networks concepts are available to manipulate the CAN bus characteristics to block communication after an intrusion is detected.

Known solutions have some shortcomings. In the context of Automotive Ethernet networks, it is known from the state in the art to only use passive actions. For example, detected intrusions are logged and/or reported to a SOC. Thus, after an intrusion is detected an interaction with a SOC and an analysis in a SOC is necessary. A reaction of the SOC is usually performed over-the-air. Hence, if no or limited Internet connection is available a reaction to detected intrusions via a SOC might not be possible. Moreover, privacy problems can occur due to SOC reporting. All identified intrusions are logged which might result in storage issues. Static filter rules are defined which cannot be used to dynamically react after an intrusion is detected. Furthermore, SOC does not provide active action, like automatically triggering of actions to mitigate or to stop an intrusion. Thus, by using SOC it cannot be reacted fast after an intrusion is detected. In addition, it might be hard to maintain the functionality of vehicles, which are under attack.

It is therefore an object of the present invention to provide an Advanced Intrusion Prevention Manager, also referred to as AIPM, a system and a method that overcomes at least one of the mentioned disadvantages.

BRIEF SUMMARY

This object is achieved by an Advanced Intrusion Prevention Manager, by a system, and by a method for preventing intrusions according to the independent claims. The dependent claims include advantageous further developments and improvements of the present principles as described below.

According to a first aspect, an Advanced Intrusion Prevention Manager comprises a trigger channel configured to receive intrusion information from an in-vehicle network. The Advanced Intrusion Manager further comprises a Channel configured to receive system and environmental information from a vehicle, a Communication channel to vehicle components, a data storage for storing information comprising network security policies, and a Communication channel to and from the data storage. Moreover, the Advanced Intrusion Prevention Manager is configured to analyze the received intrusion information and based on the analyzed intrusion information and depending on the received system and environmental information select a network security policy stored in the data storage. The AIPM is additionally configured to communicate the selected network security policy via the communication channel to at least one vehicle component in the in-vehicle network, and to activate the communicated network security policy in dependency on the received system and environmental information.

The word "intrusion" as used herein describes an unauthorized access or attempted access into or unauthorized activity in a or any attempt to compromise a or any attack or attack attempt on a network or a network component. Intrusion information may comprise any information that relates to an intrusion.

The word "vehicle component" as used herein describes any component inside the in-vehicle network, e.g. an Electronic Control Unit or an Automotive Ethernet Switch.

The word "activate" in activate the communicated network security policy as used herein may include, be described or be replaced by any of the words enforce, execute or switch. If appropriate, the AIPM may in addition or alternatively to activating a network security policy also deactivate a network security policy e.g. by stopping execution of an activated network security policy or by removing a stored network security policy from the data storage.

The word "system information" as used herein describes any information concerning a vehicle, e.g. transmitted from a network component inside the in-vehicle network and received by the AIPM, e.g. transmitted information from an Electronic Control Unit, that relates to vehicle state information, e.g. "parked", "driving", "stopped", "engine off".

The word "environmental information" as used herein describes any information concerning the environment of a vehicle, e.g. transmitted from a device that is configured to receive information from the environment and that is received by the AIPM, e.g. transmitted local information from a Global Positioning System receiver, also referred to as GPS receiver, or transmitted information from a rain sensor indicating whether it is raining or not.

The AIPM may receive system information and environmental information frequently and store the system information and environmental information within the data storage. In order to save storage capacity, the AIPM may delete old system and environmental information after receiving new system and environmental information.

It is understood that the AIPM cannot be used to detect intrusions. The AIPM can be regarded as a controller which reacts on intrusions from a network security perspective. Furthermore, it is understood that the AIPM, in order to analyze intrusion information, needs to receive intrusion information. For example, an Intrusion Detection System and/or an Intrusion Detection System Sensor, also referred to as IDS Sensor, may be included in the in-vehicle network and the AIPM via a proper channel, e.g. the trigger channel, receives intrusion information from the respective Intrusion Detection System and/or the Intrusion Detection System Sensor. Furthermore, the AIPM may receive intrusion information via the trigger channel from a SOC. Moreover, the trigger channel in some embodiments may be used by non-intrusion events, e.g., managing policies based on geo-locations, based on time events and/or based on system and environment information.

It is further understood that the AIPM receiving the intrusion information is triggered by the intrusion information to react on the intrusion. The intrusion information may include any information that can be used by the AIPM to react proper on an intrusion event. For example, intrusion information may comprise but is not limited to network location of an intrusion and/or classification of the identified intrusion.

Furthermore, in principle AIPM may be introduced in any in-vehicle network wherein preferably the AIPM is introduced in an Automotive Ethernet in-vehicle network.

To select a network security policy, the AIPM not only introduces intrusion information for the decision which network security policy may be proper to communicate, but also received system and environmental information. The data storage may include a plurality of network security policies and the AIPM may decide from the plurality of network security policies to select one or more network security policies in order to communicate the selected network security policies to at least one component in the in-vehicle network.

Moreover, the stored network security policies may be categorized inside the data storage, e.g. depending on location of the at least one network component, depending on classification of the intrusion, depending on system state, e.g. vehicle state, and depending on environmental state. Thus, how to react on a respective intrusion may be already pre-configured by the AIPM. The AIPM can be triggered by received intrusion information and react on received intrusion information in an automated fashion. The AIPM thus, can react very fast after an intrusion is detected and the intrusion information is received by the AIPM. Furthermore, because the AIPM may react in an automated fashion, there is no need for a communication to and from a SOC. The communication to and from a SOC can at least be reduced.

In some embodiments, network security policies may be secured, e.g. by digital signatures which are verified for deployment and/or activation. It is understood that the digital signatures can be created by a backend or SoC or factory to ensure the authenticity and integrity of the network security policies so that an attacker cannot manipulate them.

A further advantage of the AIPM is that it can easily be integrated in a central network controller CNC as e.g. defined in IEEE 802.1Qcc.

It is understood that between the communication of a network security policy and the activation of the communicated network security policy some time may elapse. Since, for the activation of the communicated network security policy, the AIPM takes the received system and environmental information into account, the AIPM may decide to activate the respective communicated network security policy that itself depends on system and environmental information when the requirements for the respective system and environmental information are met. For example, the AIPM may select a network security policy that should only be activated when the vehicle state is "parked", the received system information however, indicates that the vehicle state is "driving". The AIPM may still communicate the respective network security policy to the affected network component, e.g. because the policy suits best or because there is no other suitable policy. The communication of the policy may then be carried out in preparation for a moment when the received system information indicates "parked".

In an embodiment of the present invention, the Advanced Intrusion Prevention Manager is configured to communicate via the communication channel to vehicle components in a secure manner.

For example, a Virtual Local Area Network, also referred to as VLAN, or security communication keys or secure in-vehicle communication may be used to secure the communication via the communication channel to the vehicle components. It is thus possible, to enhance the security of the communication of the AIPM. It is understood that in some embodiments further channels to and from the AIPM may be secured if necessary.

In an embodiment, the Advanced Intrusion Prevention Manager AIPM is located outside the vehicle. For example, the AIPM can be located at a backend, e.g. a component supplier Tier-n, an original equipment manufacturer OEM backend or an SOC. The advantage of an AIPM located outside the vehicle is that no resources are needed for the AIPM inside an in-vehicle network while taking advantage of an AIPM as described herein.

However, it may be advantageous to locate an AIPM inside a vehicle. Therefore, in another embodiment, the Advanced Intrusion Prevention Manager AIPM is located inside the vehicle. For example, an AIPM may be located on an ECU, a gateway, a domain controller and/or automotive ethernet switch. It is thus possible for the AIPM to communicate with respective components without the necessity of an over-the-air connection to operatively connect to in-vehicle components. Hence, the AIPM may react on an intrusion even if no or limited Internet connection is available.

In a further embodiment, the Advanced Intrusion Prevention Manager AIPM comprises a communication channel to and from a backend.

The backend communication channel may be used for verification and/or validation purposes, e.g., checking the correct deployment of network security policies. Furthermore, the backend communication channel may be used for a communication to and from a SOC to transmit and receive intrusion information, e.g., for supporting a future intrusion response process.

In another embodiment, the Advanced Intrusion Prevention Manager is configured to receive information about a network structure of the in-vehicle network together with network security policies linked to the network structure and to store the information about the network structure together with network security policies linked to the network structure in the data storage in the data storage.

It is understood that the network structure of the in-vehicle may comprise a plurality of network components and at least one network component may form a network segment in the in-vehicle network. It is further understood that linked to the network structure may include linked to a specific network segment and/or linked to specific network components.

Such a configuration enables the AIPM to selectively select, communicate and activate specific network security policies in dependency on the network structure. For example, based on the network structure information it is possible to decide which network segments are responsible for which functionalities of the vehicle, e.g. some functionalities may be responsible for essential functionalities like steering and braking. In case an intrusion is detected within the in-vehicle network and intrusion information is received by the AIPM, AIPM may decide to select, communicate and activate network security policies with regard to maintain only essential vehicle functionalities and to confine the intrusion inside network segments that are not responsible for the essential functionalities. It is thus possible to maintain specific functionalities of the vehicle.

For example, the AIPM may receive, e.g. during production, via a channel to the backend, or via other sources, e.g., Centralized User Configuration according to IEEE 802.1Qcc, information about the network structure and network security policies that are linked to the network structure.

In an embodiment, the Advanced Intrusion Prevention Manager is configured to maintain different network security states with regard to the network structure and to select, communicate and activate different network security policies in dependency on the security states.

For example, it is possible for AIPM to select, communicate and activate specific network security policies in dependency on different security states linked to the network structure and thus with respect to the entire in-vehicle network or specific network segments and/or specific network components.

For example, internal security states may comprise:

state 1: network security policies are selected, communicated and activated where all specified functionalities of a specific network segment or the entire in-vehicle network, are available.

state 2: network security policies are selected, communicated and activated where the functionality of a specific network segment or the entire in-vehicle network is to some degree restricted.

state n−1: network security policies are selected, communicated and activated where the functionality of a specific network segment or the entire in-vehicle network is severely restricted.

state n: network security policies are selected, communicated and activated where only essential functionality regarding a so-called "limp home mode", e.g. essential functionality to drive the car to the next garage, is available or no functionality of a specific network segment or the entire in-vehicle network is available, e.g. vehicle must be parked on the side lane, or a specific network segment is shutdown.

Additionally, security states may comprise a classification of specific network segments, e.g. important, less important, not important. For example, the AIPM may decide to communicate and activate network security policies in accordance to priority, e.g. only in network segments with classification less important or important, but with a priority in a segment that is classified important. Thus, network security policies may be communicated and activated first in a network segment classified as important and subsequently in a network segment classified as less important and so on.

It is understood that in an embodiment, AIPM may limit and/or regulate based on different security states, system and environmental information, and/or backend information the functionality of different network segments.

It is understood that the network security policies stored in the data storage may be grouped in different ways, e.g. depending on which kind of intrusion is executed in the in-vehicle network, depending on the functionality of the vehicle, e.g., fully functional vs. essential functionality and/or depending on a security state.

In an embodiment, the stored network security polices comprise at least one of the security actions: different VLAN assignments, traffic filtering, including blocking, rerouting of traffic, bandwidth throttling, traffic isolation, traffic tagging, traffic manipulation. It is understood that the aforementioned security actions are just examples and the present invention is not limited to these security actions.

According to a second aspect, a system to prevent intrusions in an in-vehicle network comprises at least two Advanced Intrusion Prevention Managers AIPMs according to the invention.

An advantage of such a system is that the two AIPMs may interact with each other and e.g. interchange operating experience concerning intrusions and/or network security policies.

Moreover, it is possible that the at least two AIPMs build a hierarchy, e.g. a tree like structure. For example, the at least two AIPMs may build a server client structure with a central AIPM server and at least one AIPM client. The central AIPM server then may be responsible for the entire in-vehicle network whereas the AIPM client is only responsible for a specific network segment or only one network component. The central AIPM then may be responsible for the distribution and activation of network security policies to specific AIPM clients. Additionally, the AIPM client may be then responsible to store the distributed network security policies and communicate and activate them in the specific network segment or network component for which the AIPM client is responsible.

Furthermore, an AIPM client may receive intrusion information via the central AIPM server, which the AIPM client analyzes and based on the analyzation selects, communicates and activates network security policies.

In an embodiment, at least one of the at least two Advanced Intrusion Prevention Managers is installed inside the vehicle. This embodiment bears the advantage that a direct communication within the in-vehicle network is possible.

In an embodiment, at least one of the at least two Advanced Intrusion Prevention Managers is installed outside the vehicle. This embodiment bears the advantage, that one AIPM may be located in a backend and receives updates form the backend, e.g. network security policy updates or updates concerning the which specific network security policies should be linked to the network structure, e.g. which network security policy should be linked to which network segment. Thus, the external AIPM may directly communicate with the internal AIPM and distribute updates, e.g. to a central AIPM server that is located inside the vehicle.

In an embodiment, the at least two Advanced Intrusion Prevention Managers comprise a communication channel to operatively communicate with each other. It is understood that the AIPM inside a vehicle can communicate via wired connections whereas a communication with an AIPM outside the vehicle is carried out via an over-the-air-connection, i.e. a wireless connection.

In an embodiment, the at least two Advanced Intrusion Prevention Managers being configured to locally store policies such that a first Advanced Intrusion Prevention Manager comprises a first set of policies and a second Advanced Intrusion Prevention Manager comprises a second set of policies and wherein the first set of policies is different from the second set of policies.

It is thus ensured that for example different AIPM clients which are responsible for different network segments or network components will only select, communicate and activate security policies that are linked to the network segment or network component for which the specific AIPM client is responsible for. Thus, it is possible to react faster on intrusions and to distribute responsibilities for specific network segments.

In an embodiment, the system comprises an Intrusion detection system IDS and/or an Intrusion detection system sensor installed inside the in-vehicle network. It is understood that the AIPM cannot detect intrusions, therefore, an Intrusion detection system and/or an Intrusion detection system sensor may be installed inside the in-vehicle network that is operatively connected to at least one AIPM. Preferably, the IDS and/or IDS sensor is operatively connected to a central AIPM server.

A third aspect of the invention is directed to a method for preventing intrusions in an in-vehicle network by an Advanced Intrusion Prevention Manager, with:

Receiving intrusion information. The intrusion information is received from an in-vehicle network, preferably from an Automotive Ethernet in-vehicle network.

Receiving system and environmental information. This is done, e.g. via a Channel.

Analyzing the received intrusion information.

Selecting, based on the analyzed intrusion information and the received system and environmental information, at least one network security policy from a set of network security policies. These network security policies are preferably stored in a data storage.

Communicating the selected network security policy to at least one vehicle component in the in-vehicle network. This is preferably done via a communication channel.

Activating the communicated network security policy in dependency on the received system and environmental information.

Further features of the present invention will become apparent from the following description and the appended claims in conjunction with the figures.

DETAILED DESCRIPTION

Figure 1:
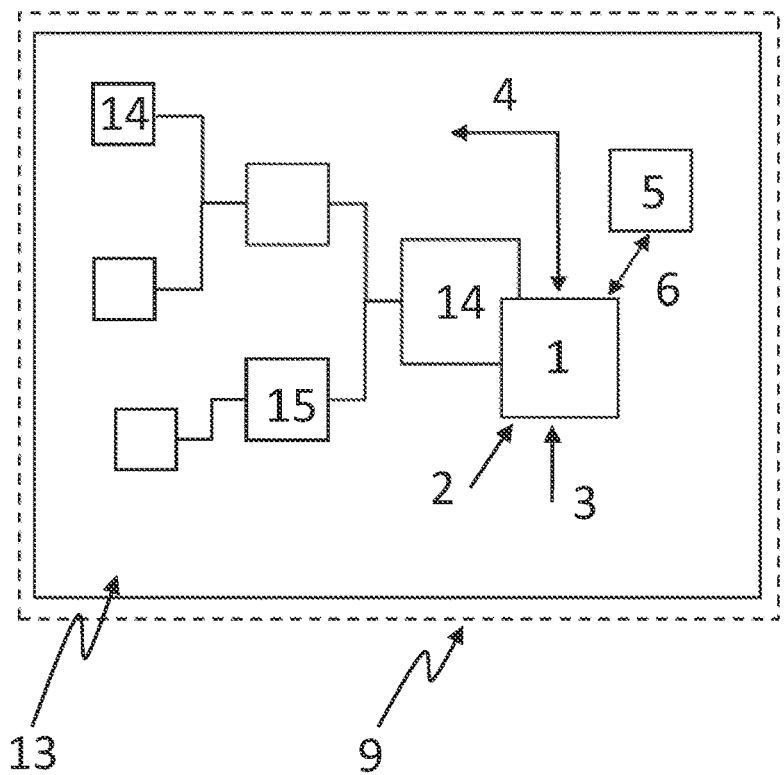
FIG. 1 schematically illustrates a vehicle with a first embodiment of an Advanced Intrusion Prevention Manager according to the present invention, FIG. 2 schematically illustrates a vehicle with a second embodiment of an Advanced Intrusion Prevention Manager according to the present invention, FIG. 3 schematically illustrates a first embodiment of a system according to the present invention, FIG. 4 schematically illustrates a second embodiment of a system according to the present invention.

For a better understanding of the principles of the present invention, embodiments of the invention will be explained in more detail below with reference to the figures. Like reference numerals are used in the figures for the same or equivalent elements and are not necessarily described again for each figure. It is to be understood that the invention is not limited to the illustrated embodiments and that the features described may also be combined or modified without departing from the scope of the invention as defined in the appended claims.

FIG. 1 schematically illustrates a vehicle 9 with a first embodiment of an Advanced Intrusion Prevention Manager 1 AIPM according to the present invention. The vehicle 9 comprises an Automotive Ethernet in-vehicle network 13 with a plurality of network components that form the network structure. The network components are ECU's 14 and automotive ethernet switches 15.

To prevent the in-vehicle network 13 from an intrusion, the Advanced Intrusion Prevention Manager 1, also referred to as AIPM 1, is located inside the vehicle on one of the ECU's 14. The Advanced Intrusion Prevention Manager 1 comprises a trigger channel 2 via witch the AIPM 1 receives intrusion information from an in-vehicle network 13. The AIPM 1 further comprises a channel 3 via witch the AIPM 1 receives environmental information and system information of the vehicle 9 and a communication channel 4 via witch the AIPM 1 is operatively connected to vehicle components.

The environmental information includes local information received from a Global Positioning System GPS and the system information include vehicle state information, e.g. "driving", "stopped", "engine off", "parked", of the vehicle.

The communication channel 4 to the vehicle components is secured by communication keys.

Moreover, the AIPM 1 comprises a data storage 5 in which network security policies and frequently received environmental and system information are stored. The AIPM further comprises a communication channel 6 to and from the data storage 5 to operatively connect the data storage 5 to the AIPM 1.

After an intrusion is detected, e.g. by an Intrusion Detection System IDS (not shown) that is introduced inside the in-vehicle network 13 and operatively connected with the AIPM 1, the IDS forwards information about the intrusion to the AIPM 1. The AIPM 1 thus receives intrusion information from the in-vehicle network. For example, the intrusion information may comprise the segment and the classification of the intrusion. After receiving the intrusion information, the AIPM 1 analyzes the intrusion information. Based on the analyzed intrusion information and in dependency on the received system and environmental information the AIPM 1 selects a network security policy that is stored in the data storage 5. The AIPM 1 communicates the selected network security policy via the communication channel 4 to at least one ECU 14 in the in-vehicle network 13. After communicating the selected network security policy, the AIPM 1, in dependency on the received system and environmental information, activates the communicated network security policy.

Figure 2:
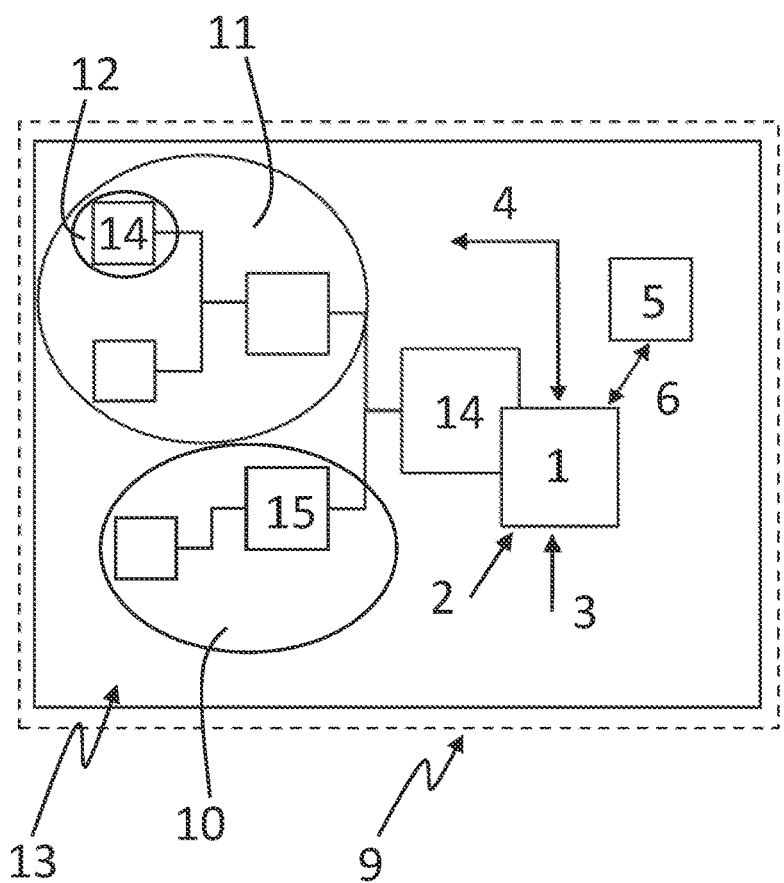

FIG. 2 schematically illustrates a vehicle 9 with a second embodiment of an Advanced Intrusion Prevention Manager 1 according to the present invention. As can be seen, the network structure of the in-vehicle network 13 comprises a plurality of network components, e.g. ECU's 14 and automotive ethernet switches 15.

The difference to the AIPM 1 illustrated in FIG. 1 is that the AIPM 1 shown in FIG. 2 is integrated in a Centralized Network Configuration (CNC) defined in IEEE 802.1Qcc and via Centralized User Configuration of IEEE 802.1Qcc receives information about the network structure of the in-vehicle network 13 and network security policies linked to the network components of the network structure. All the afore-mentioned information is stored in the data storage 5.

The AIPM 1 uses the afore-mentioned information taking system and environmental information into account, to classify the network structure into different segments and to link the different segments with different segment specific security states. The different security states may be specified as high, mid or low. For example, if an intrusion is detected in a network segment that affects the breaking system of the vehicle, and the system status is "driving" it would be worth to shut down the breaking system.

However, as can be seen in FIG. 2 the in-vehicle network in accordance with security states maintained by the AIPM 1, is classified into three different network segments 10, 11, 12. A first network segment 10 comprises two network components and is classified as less important, a second network segment 11 comprises three network components, classified important, and a third network segment 12 comprises one network component, classified as high important, wherein the third network segment 12 is included in the second network segment 11. The AIPM 1 stores the security status, i.e. the classification, of the three network segments and the linked different internal security states in the data storage 5. Thus, segment specific policies are stored by the AIPM 1 in data storage 5.

After an intrusion is detected, the AIPM 1 receives intrusion information including the network location of the intrusion and the classification of the identified intrusion. For example, AIPM 1 receives intrusion information that network components in the second network segment 11 are affected by an intrusion and classification is high.

The AIPM 1 then analyzes the intrusion information. Based on the analyzed intrusion information, in dependency on the received system and environmental information, with regard to the affected network segment and the security status of the affected network segment, the AIPM 1 selects a proper network security policy.

Since the security state of the third network segment 12 indicates a high importance, the third network segment 12 is prioritized when compared the second network segment 11, classified as important, the AIPM 1 will thus first select a network security policy that corresponds to the third network segment 12.

The AIPM 1 then communicates the selected network security policy via the communication channel 4 to the third network segment 12, i.e. the network component in the third network segment 12. After communicating the selected network security policy, the AIPM 1 in dependency on the received system and environmental information activates the communicated network security policy.

After the activation of the communicated network security policy in the third network segment 12, the AIPM 1 may, depending on the intrusion information, wait to receive further intrusion information or directly select, communicate and activate a specific network security policy for the second network segment 11. It is understood that the AIPM 1 may start in parallel to select and communicate network security policies for the third network segment 12 and the second network segment 11 and only prioritize the activation of the respective network security policy.

FIG. 3, FIG. 4, FIG. 5, FIG. 6 and FIG. 7 schematically illustrate embodiments of a system according to the present invention. All the systems comprise at least two AIPMs 1, 1', 20, 21, 30, 31, wherein all AIPMs are similar to the AIPM 1 as shown in FIG. 2 but with slight differences. Those differences are illustrated in the following.

Figure 3:
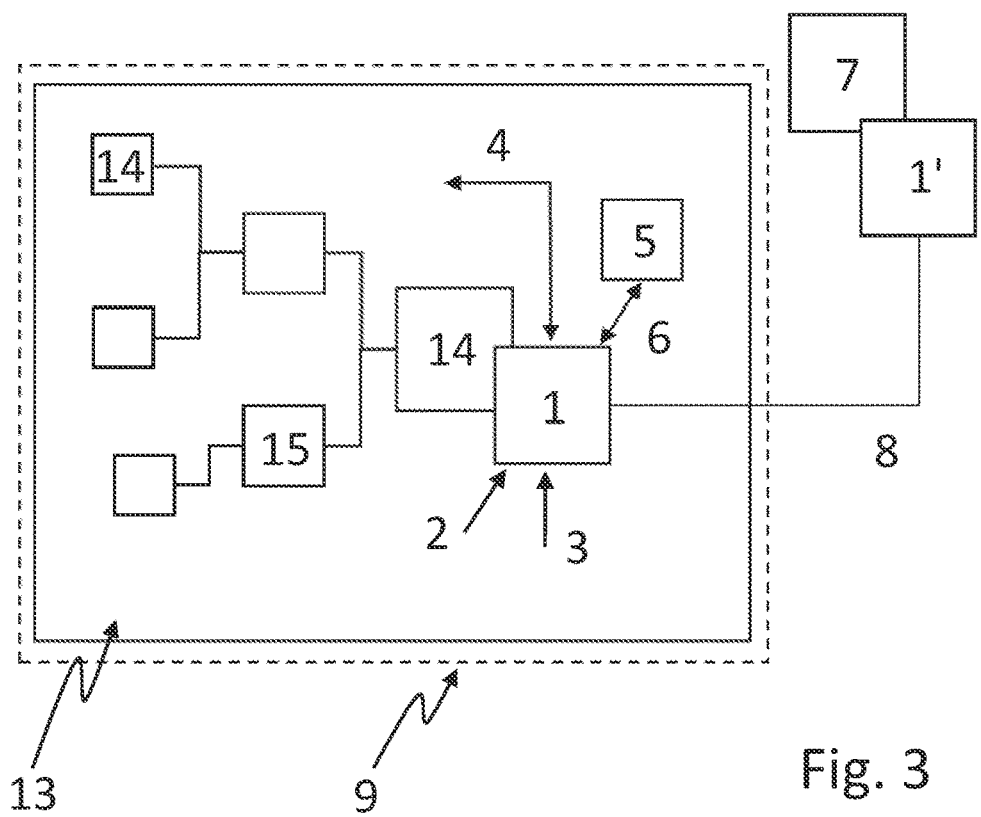

FIG. 3 schematically illustrates a first embodiment of a system according to the present invention. The system comprises two Advanced Intrusion Prevention Managers 1, 1'. A first AIPM 1 is installed inside the vehicle 9 and a second AIPM 1' is installed outside the vehicle 9 at a backend 7. The first and the second AIPM 1, 1' communicate with each other via a communication channel that operatively connects the first AIPM 1 to the second AIPM 1'. Here the communication channel is identical to a communication channel 8 to and from the backend 7. The backend 7 is an Original Equipment Manufacturer (OEM) backend 7. Via the communication channel 8 to and from the backend 7 the AIPM 1 inside the vehicle 9 receives updates for the network security policies.

After an intrusion is detected, the AIPM 1 inside the vehicle, reacts on the intrusion, by selecting, communicating and activating network security policies. The AIPM 1' outside the vehicle 9 checks for a correct deployment of the network security policies. For example, the AIPM 1' outside the vehicle 9 may check for a correct deployment of network security policies, by analyzing intrusion information, vehicle state information and environmental information together with information which network security policy was selected, communicated and activated by the first AIPM 1. If after analyzing, the second AIPM 1' comes to the decision that the deployment of the network security policies is not correct, it may send an update for the security policies stored in the data storage 5 of the first AIPM 1, by communicating and activating network security policies in the first AIPM 1.

Figure 4:
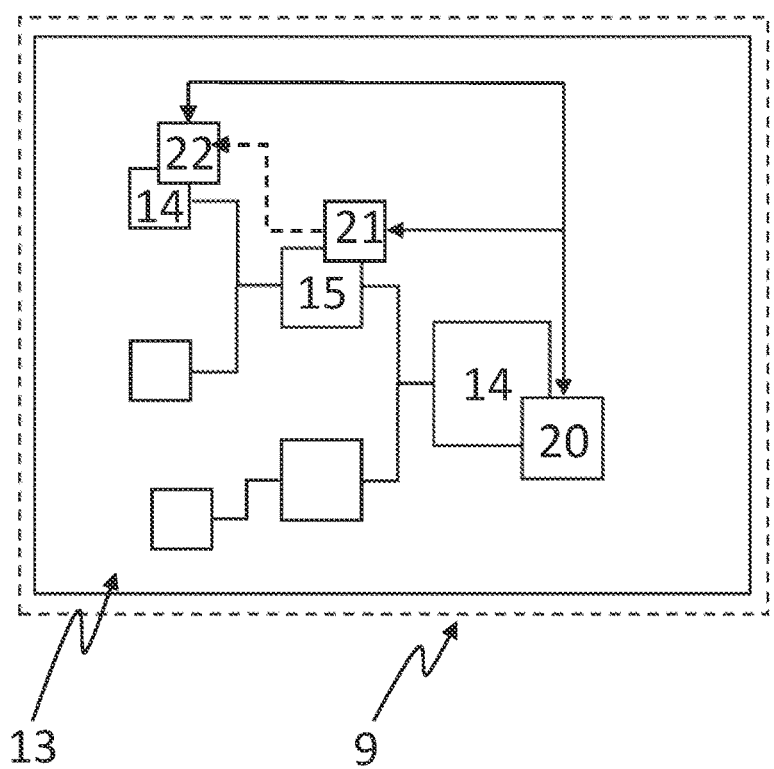

FIG. 4 schematically illustrates a second embodiment of a system according to the present invention. Here, the system comprises three AIPMs 20, 21, 22, a Central AIPM server 20, an AIPM server/client 21 and an AIPM client 22. All the AIPMs 20, 21, 22 are installed inside the vehicle 9. The Central AIPM server 20 is located on a first ECU 40, the AIPM client 22 is located on a second ECU 41 and the AIPM server/client 21 is located on an Automotive Ethernet switch 15.

The three AIPMs 20, 21, 22 build a hierarchy with a tree-like structure. The central AIPM server 20 distributes a first set of network security policies to the AIPM server/client 21 and a second set of network security policies to the AIPM client 22, wherein the first set of network security policies differs from the second set of network security policies. Both, the AIPM server/client 21 and the AIPM client 22 are configured to locally store the respective distributed network security policies, e.g. within respective data storage. The AIPM server/client 21 and the AIPM client 22 are not only responsible for storing the distributed network security policies but also for the selection, communication and activation of the same. The AIPM server/client 21 operates in a server/client mode, where the AIPM server/client 21 receives intrusion information only from the central AIPM server 20. The AIPM server/client 21 analyzes the received intrusion information and selects a respective network security policy, communicates it to and activates it in the Automotive Ethernet switch 15. Additionally, the AIPM server/client 21 acts as a server for a specific network segment to select, communicate and activate network security policies inside the specific network segment, e.g. the network components within the specific network segment.

The central AIPM server 20 is additionally configured to only distribute network security policies to the AIPM server/client 21 and the AIPM client 22 after a restart of the vehicle 9 and/or if the central AIPM server 20 receives an update, e.g. from a backend 7 and/or in a garage. After the distribution of the network security policies, the central AIPM server 20 is configured to only activate locally stored policies on the AIPM server/client 21 and the AIPM client 22. Hence, the central AIPM server 20 does not distribute network security policies on each intrusion event. The central AIPM server 20 is thus configured to save bandwidth if it is important for the Automotive Ethernet in-vehicle network 13.

Figure 5:
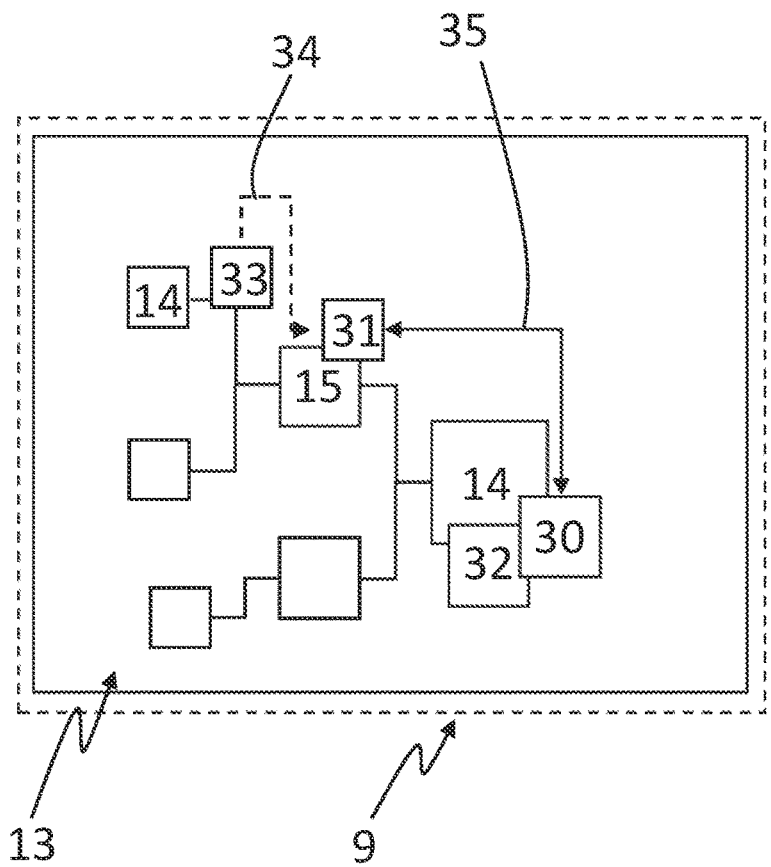
FIG. 5 schematically illustrates a third embodiment of a system according to the present invention.

FIG. 5 schematically illustrates a third embodiment of a system according to the present invention. The system comprises two AIPMs 30, 31, a Central AIPM server 30 and an AIPM server/client 31. The system further comprises an Intrusion Detection System 32, also referred to as IDS 32, an IDS sensor 33 and a trigger channel 34 from the IDS sensor to the AIPM server/client 31. The IDS sensor 33 is configured to detect intrusions inside a specific network segment for which the AIPM server/client 31 is responsible. Via the trigger channel 34 the AIPM server/client 31 receives intrusion information from the IDS sensor 33.

The system additionally comprises a communication channel 35 that operatively connects the AIPM server/client 31 with the central AIPM server 30. Via the communication channel 35, e.g. the central AIPM server 30 distributes network security policies and the AIPM server/client 31 transmits intrusion information to the central AIPM server 30.

In case an intrusion event is detected by the IDS sensor 33 and the AIPM server/client 31 receives the intrusion information from the IDS sensor 33, the AIPM server/client 31 is not only configured to act locally, e.g. analyze intrusion information, select stored network security policies, communicate and activate stored network security policies within its specific network segment, but also to transmit intrusion information and information about the selected network security policies to the central AIPM server 30. The central AIPM server 30 after receiving the respective information from the AIPM server/client 31, analyzes the received information. Since the central AIPM server 30 is not only responsible for a specific network segment but for the whole in-vehicle network 13, the central AIPM server 30 may have stored or may select stored network security policies that differ from the network security policies, communicated and activated by the AIPM server/client 31. However, the central AIPM server 30 has a higher priority level compared to the AIPM server/client 31. Thus, network security policies communicated and activated by the central AIPM server 30 are treated with higher priority compared to the network security policies communicated and activated by the AIPM server/client 31. Hence, the communication of network security policies by the central AIPM server 30 to the AIPM client 31 may not only result in an activation of the communicated network security policies from the central AIPM server 30 but also in a deactivation of the network security policies communicated and activated by the AIPM server/client 31.

Figure 6:
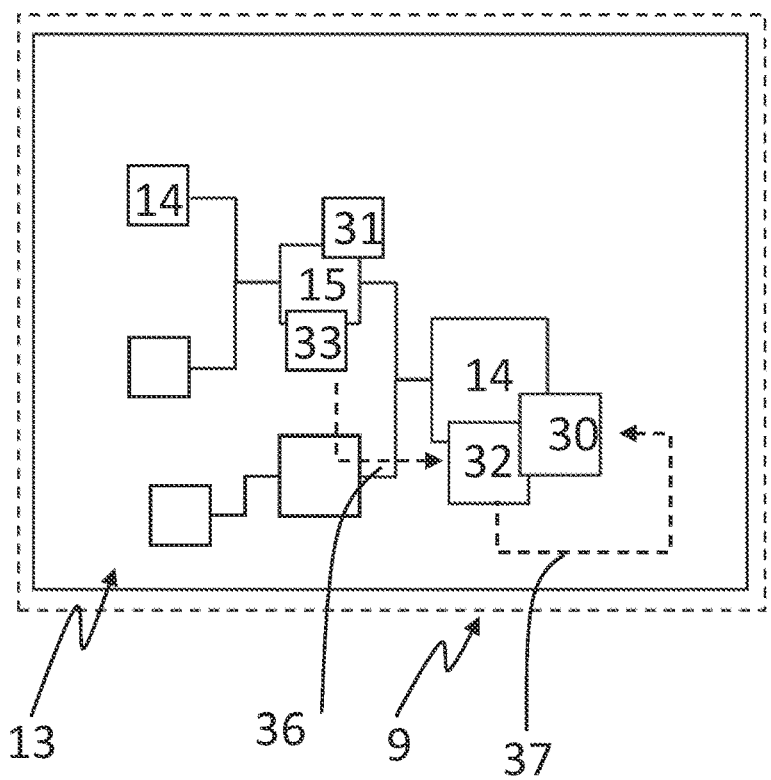
FIG. 6 schematically illustrates a fourth embodiment of a system according to the present invention.

FIG. 6 schematically illustrates a fourth embodiment of a system according to the present invention. The system shown in FIG. 6 differs from that in FIG. 5 in that it neither comprises a trigger channel 34 from the IDS sensor 33 to the AIPM client 31 nor a communication channel 35 that operatively connects the AIPM client 31 with the central AIPM server 30. The system according to FIG. 6 rather comprises a communication channel 36 from the IDS sensor 33 to the main IDS 32 to transmit intrusion information from the IDS sensor 33 to the main IDS 32 and a trigger channel 37 to transmit intrusion information from the main IDS 32 to the central AIPM server 30. The central AIPM server 30 thus directly receives intrusion information and acts properly, e.g. analyzes the intrusion information, selects respective network security policies, distribute network security policies and/or communicates and activates network security policies.

Figure 7:
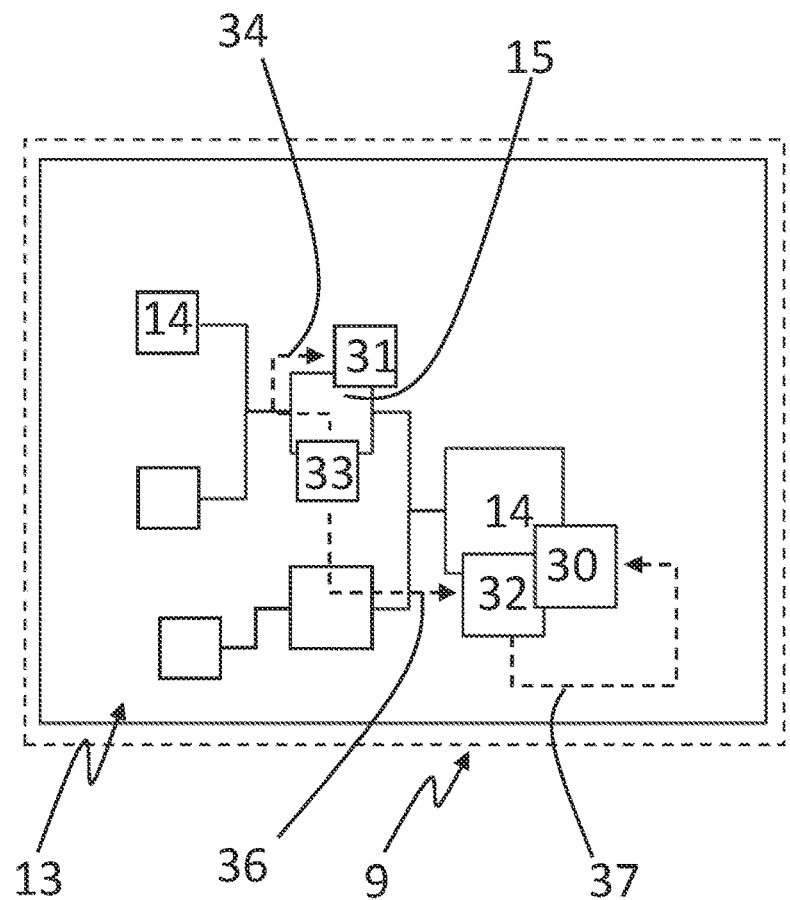
FIG. 7 schematically illustrates a fifth embodiment of a system according to the present invention.

FIG. 7 schematically illustrates a fifth embodiment of a system according to the present invention. The system shown in FIG. 7 differs from that in FIG. 5 in that it further comprises a communication channel 36 from the IDS sensor 33 to the main IDS 32 to transmit intrusion information from the IDS sensor 33 to the main IDS 32 and a trigger channel 37 to transmit intrusion information from the main IDS 32 to the central AIPM server 30. Thus, the IDS sensor is forwarding intrusion information separately to the main IDS 32. Intrusion information is received by the central AIPM server 30 from the main IDS 32.

Figure 8:
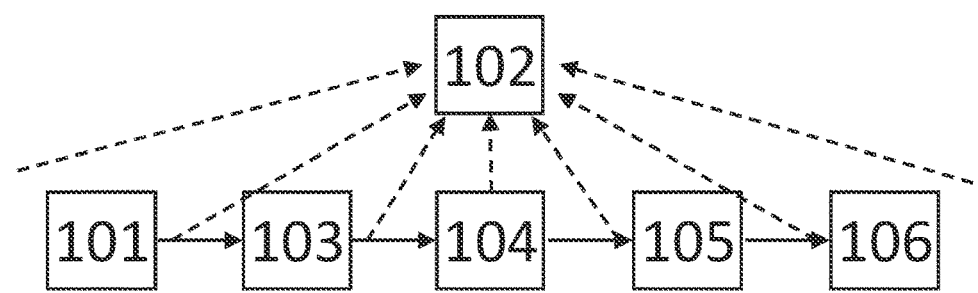
FIG. 8 is a flowchart of a method for the prevention of intrusions according to the present invention.

FIG. 8 is a flowchart of a method 100 for the prevention of intrusions according to the present invention.

The Method 100 starts with receiving 101 intrusion information from an in-vehicle network 13. However, in parallel, prior to and/or after receiving 101 intrusion information, the AIPM 1 may frequently perform receiving 102 system and environmental information via the Channel 3. After receiving 101 intrusion information the AIPM 1 performs analyzing 103 the received intrusion information. Based on the analyzed intrusion information and the received system and environmental information, the AIPM performs selecting 104 at least one network security policy from a set of network security policies stored in a data storage 5. After selecting 104 the AIPM performs communicating 105 the selected network security policy via the communication channel 4 to at least one vehicle component 14, 15 in the in-vehicle network 13 and performs activating 106 the communicated network security policy in dependency on the received system and environmental information.

Figure 9:
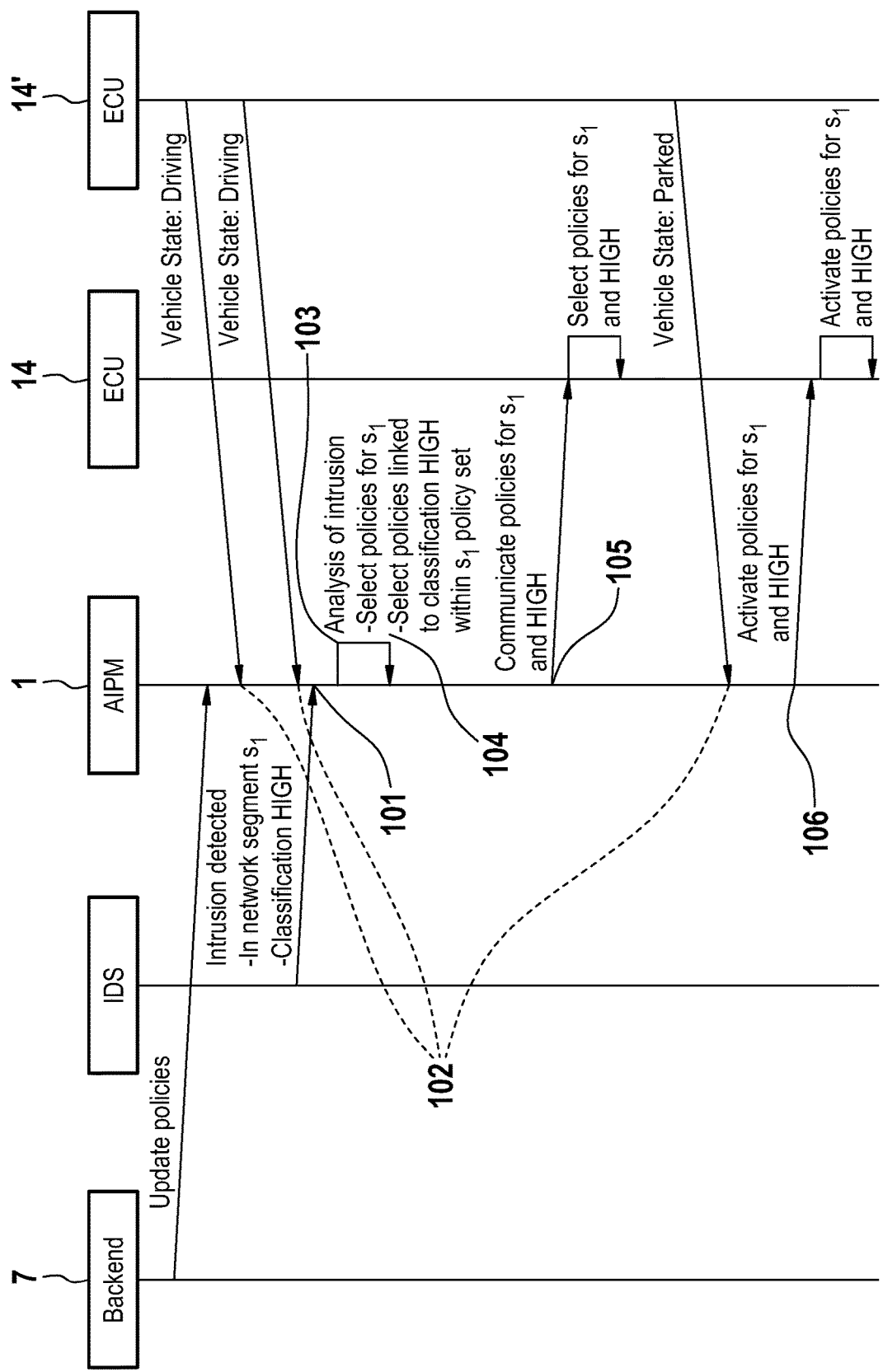
FIG. 9 is an illustration of a more detailed description of the invention.

FIG. 9 is an illustration of a more detailed description of the invention.

Prior to a detection of an intrusion, in this example AIPM 1 receives network security policies and/or network security policy updates from a backend 7. The AIPM stores the network security policies in a data storage and/or respectively updates already stored network security policies. Furthermore, the AIPM 1 frequently receives 102 vehicle state information by a second ECU 14' and environmental information by a GPS receiver (not shown). The AIPM 1 additionally stores actual vehicle state information and actual environmental information in the data storage. When the AIPM 1 receives new vehicle state information and environmental information, the AIPM is configured to replace old stored vehicle state information and environmental information by the new vehicle state information and environmental information.

In 101, the AIPM 1 receives intrusion information transmitted by an IDS. The intrusion information includes information about the network segment, which is affected by the intrusion, and a classification of the intrusion. The AIPM is thus informed that the intrusion affects network segment s1 and that the classification is high.

In 103, the AIPM 1 analyzes the intrusion information and in 104 selects from a set of network security policies a respective network security policy that is linked to the network segment s1 and to the classification high. Furthermore, the decision which network security policy is selected by the AIPM 1 also depends on the received system and environmental information.

The AIPM after selecting 104 the respective network security policy in 105 communicates it to the affected network segment s1. In this example, the first ECU 14 is responsible for the first network segment s1 and the selected network security policy is communicated to the first ECU 14. Since the received system information from the second ECU 14' indicates that the vehicle 31 is driving, and the communicated network security policy should only be activated if the vehicle is parked for a while, the AIPM 1 waits to activate the communicated network security policy until the AIPM 1 receives system information from the second ECU that indicates that the vehicle 31 is parked. Then the AIPM in 106 activates the communicated network security policy.

The invention claimed is:

1. An Advanced Intrusion Prevention Manager comprising:
   a trigger communication channel that receives intrusion information from an automotive Ethernet in-vehicle network,
   a system-and-environmental-information communication channel that receives system and environmental information from a vehicle, wherein the environmental information specifies information about an external environment of the vehicle,
   a vehicle-component Communication channel to vehicle components,
   a non-transitory computer-readable data storage that stores information comprising network security policies, and
   a data-storage communication channel to and from the data storage,
   the Advanced Intrusion Prevention Manager performing operations, by a processor executing computer-executable instructions, the operations comprising:
   analyze the received intrusion information,
   based on the analyzed intrusion information and depending on received system and environmental information select a network security policy stored in the data storage,
   communicate the selected network security policy via the vehicle-component communication channel to at least one vehicle component in the automotive Ethernet in-vehicle network, and
   activate the communicated network security policy in dependency on the received system and environmental information, wherein the automotive Ethernet in-vehicle network comprises a plurality of network components that form a network structure having a plurality of network segments, the network components comprising at least one electronic control unit (ECU) and at least one automotive Ethernet switch, and wherein the activated and communicated network security policy specifies different segment-specific security states for a respective plurality of the network segments of the network structure.

2. The Advanced Intrusion Prevention Manager according to claim 1, the Advanced Intrusion Prevention Manager being configured to communicate via the vehicle-component communication channel to vehicle components in a secure manner.

3. The Advanced Intrusion Prevention Manager according to claim 2, the Advanced Intrusion Prevention Manager being located inside or outside the vehicle.

4. The Advanced Intrusion Prevention Manager according to claim 3, the Advanced Intrusion Prevention Manager comprising a Communication channel to and from a back-end.

5. The Advanced Intrusion Prevention Manager according to claim 4, the Advanced Intrusion Prevention Manager being configured to
   receive information about the network structure of the in-vehicle network,
   store the information about the network structure in the storage device.

6. The Advanced Intrusion Prevention Manager according to claim 5, the Advanced Intrusion Prevention Manager being configured to maintain different network security states with regard to the network structure and to select, communicate and activate different network security policies in dependency on the security states.

7. A system to prevent intrusions in an in-vehicle network, the system comprising at least two Advanced Intrusion Prevention Managers, each of the at least two Advanced Intrusion Prevention Managers comprising:
   a trigger communication channel that receives intrusion information from an automotive Ethernet in-vehicle network,
   a system-and-environmental-information communication channel that receives system and environmental information from a vehicle, wherein the environmental information specifies information about an external environment of the vehicle,
   a vehicle-component communication channel to vehicle components,
   a non-transitory computer-readable data storage that stores information comprising network security policies, and
   a data-storage communication channel to and from the data storage,
   the Advanced Intrusion Prevention Manager performing operations, by a processor executing computer-executable instructions, the operations comprising:
   analyze the received intrusion information,
   based on the analyzed intrusion information and depending on the received system and environmental information select a network security policy stored in the data storage,
   communicate the selected network security policy via the vehicle-component communication channel to at least one vehicle component in the automotive Ethernet in-vehicle network, and
   activate the communicated network security policy in dependency on the received system and environmental information, wherein the automotive Ethernet in-vehicle network comprises a plurality of network components that form a network structure having a plurality of network segments, the network components comprising at least one electronic control unit (ECU) and at least one automotive Ethernet switch, and wherein the activated and communicated network security policy specifies different segment-specific security states for a respective plurality of the network segments of the network structure.

8. The system according to claim 7, wherein at least one of the at least two Advanced Intrusion Prevention Managers is installed inside the vehicle.

9. The system according to claim 8, wherein at least one of the at least two Advanced Intrusion Prevention Managers is installed outside the vehicle.

10. The system according to claim 7, the at least two Advanced Intrusion Prevention Managers comprising a communication channel to operatively communicate with each other.

11. The system according to claim 10, the at least two Advanced Intrusion Prevention Managers being configured to locally store, inside the vehicle, policies such that a first Advanced Intrusion Prevention Manager comprises a first set of policies and a second Advanced Intrusion Prevention Manager comprises a second set of policies and wherein the first set of policies is different to the second set of policies.

12. The system according to claim 11, the system comprising an Intrusion detection system and/or an Intrusion detection system sensor installed inside the in-vehicle network.

13. A method for preventing intrusions in an automotive Ethernet in-vehicle network by an Advanced Intrusion Prevention Manager, comprising:
receiving intrusion information,
receiving system and environmental information, wherein the environmental information specifies information about an external environment of the vehicle,
analyzing the received intrusion information,
selecting, based on the analyzed intrusion information and the received system and environmental information at least one network security policy from a set of network security policies,
communicating the selected network security policy to at least one vehicle component in the in-vehicle network and
activating the communicated network security policy in dependency on the received system and environmental information, wherein the automotive Ethernet in-vehicle network comprises a plurality of network components that form a network structure having a plurality of network segments, the network components comprising at least one electronic control unit (ECU) and at least one automotive Ethernet switch, and wherein the activated and communicated network security policy specifies different segment-specific security states for a respective plurality of the network segments of the network structure.

* * * * *